(12) United States Patent
Eibert et al.

(10) Patent No.: US 6,243,482 B1
(45) Date of Patent: *Jun. 5, 2001

(54) OBSTACLE DETECTION SYSTEM FOR LOW-FLYING AIRBORNE CRAFT

(75) Inventors: Max Eibert, Friedrichshafen; Christoph Schaefer, Meersburg, both of (DE)

(73) Assignee: Dornier GmbH, Friedrichshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/799,860

(22) Filed: Feb. 13, 1997

(30) Foreign Application Priority Data

Feb. 13, 1996 (DE) .............................. 196 05 218

(51) Int. Cl.$^7$ ....................................... G06K 9/00
(52) U.S. Cl. ...................... 382/103; 342/65; 701/301
(58) Field of Search .................. 382/103, 104, 382/106, 291, 294, 153, 199, 214, 260, 263, 266; 348/142, 143, 144, 148, 113; 356/4.03, 376, 2; 701/1, 301; 342/65; 340/853.3

(56) References Cited

U.S. PATENT DOCUMENTS

| | | | |
|---|---|---|---|
| 3,076,961 | 2/1963 | Bibbero | 342/53 |
| 3,735,398 | * 5/1973 | Ross | 342/21 |
| 3,739,380 | * 6/1973 | Burdic et al. | 342/65 |
| 4,232,903 | * 11/1980 | Welling et al. | 299/8 |
| 4,653,109 | * 3/1987 | Lemelson et al. | 382/107 |
| 4,674,869 | * 6/1987 | Pryor et al. | 356/3.6 |
| 4,792,904 | 12/1988 | Reinagel et al. | 701/17 |
| 4,796,997 | * 1/1989 | Svetkoff et al. | 356/376 |
| 4,802,096 | * 1/1989 | Hainsworth et al. | 701/301 |
| 4,902,126 | 2/1990 | Koechner | 356/5.08 |
| 4,988,189 | * 1/1991 | Kroupa et al. | 356/4.03 |
| 5,005,147 | * 4/1991 | Krishen et al. | 364/578 |
| 5,018,219 | * 5/1991 | Matsuzaki et al. | 382/226 |
| 5,144,373 | * 9/1992 | Moler | 356/2 |
| 5,170,352 | * 12/1992 | McTamaney et al. | 701/26 |
| 5,448,233 | * 9/1995 | Saba et al. | 340/963 |
| 5,477,459 | * 12/1995 | Clegg et al. | 701/300 |
| 5,487,172 | * 1/1996 | Hyatt | 712/32 |
| 5,488,675 | * 1/1996 | Hanna | 382/284 |
| 5,557,684 | * 9/1996 | Wang et al. | 382/107 |
| 5,579,444 | * 11/1996 | Dalziel et al. | 395/94 |
| 5,581,250 | * 12/1996 | Khvilivitzky | 340/961 |
| 5,581,930 | * 12/1996 | Langer | 43/17 |

FOREIGN PATENT DOCUMENTS

| | | |
|---|---|---|
| 2402537 | 7/1975 | (DE) . |
| 26 43 526 | 12/1977 | (DE) . |
| 3104300 | 8/1982 | (DE) . |
| 3110691 | 10/1982 | (DE) . |
| 3939731 | 6/1991 | (DE) . |
| 0 448 956 A2 | 10/1991 | (EP) . |

OTHER PUBLICATIONS

Baxes, Digital Image Processing, Principles and Applications, John Wiley & Sons, Inc., pp. 348–349, 1994.*

Negahdarjpour, "On Shape and Range Recovery from Images of Underwater Environments", IEEE 1994, pp. 92–98.*

Lange et al., "94 GHz 3D–Imaging Radar for Sensorbased Locomotion", IEEE 1989, pp. 1091–1094.*

* cited by examiner

Primary Examiner—Jayanti K. Patel
(74) Attorney, Agent, or Firm—Evenson, McKeown, Edwards & Lenahan, P.L.L.C.

(57) ABSTRACT

Obstacle warning system for low-flying airborne craft in which case the edge contours of the obstacles are visualized for the pilot in a display.

2 Claims, 4 Drawing Sheets

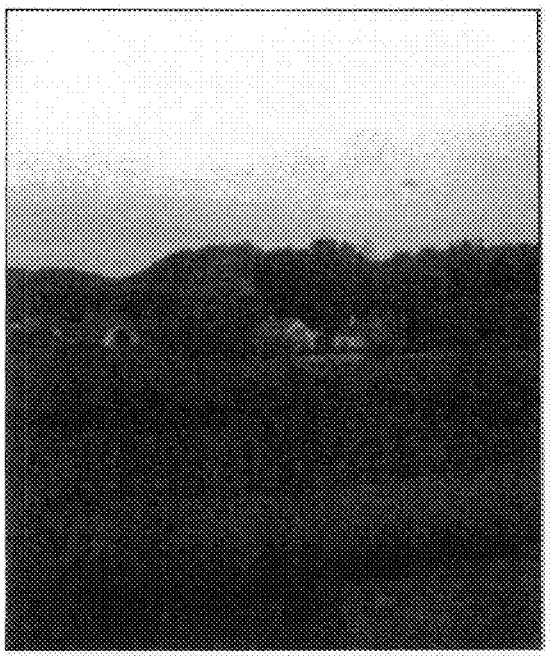
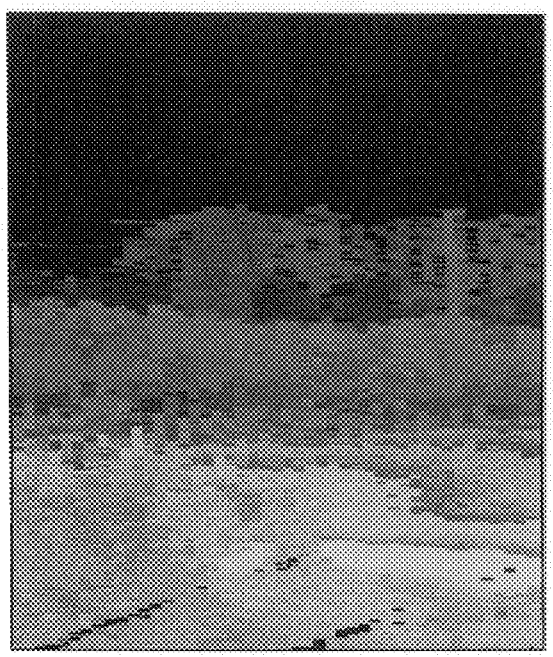
FIG. 3
FIG. 4

OBSTACLE DETECTION SYSTEM FOR LOW-FLYING AIRBORNE CRAFT

BACKGROUND AND SUMMARY OF THE INVENTION

The present invention relates to an imaging and obstacle detection system for assisting a pilot in controlling an aircraft or other vehicle, of the type which includes both a natural vision low light amplifier and a range imaging system.

In order to assure detection of obstacles which may endanger the pilot of a low-flying aircraft or of a vehicle, natural vision, low-light amplifiers or night-viewing devices are frequently not sufficient. High-resolution, laser radar based range imaging sensors supply additional obstacle information. The objective of such a system is to analyze and represent this additional information in an ergonomically optimal manner within the scope of an overall obstacle warning system for manually flying pilots. In this regard, a particularly important class of obstacles are wires or lines.

In previously known systems of this type, information generated by the range imaging system is analyzed or classified and used to generate alphanumeric or symbolic displays which alert the pilot to the location of detected obstacles. Such prior art systems, however, require substantial computer processing expenditures and result in high data rates at the output of the analyzing computer. Moreover, if such alphanumeric or symbolic displays are superimposed on the basic image generated by the natural vision observation system, they necessarily block out a portion of the image. Furthermore, because the alphanumeric display or symbols represent information which is in addition to the image generated by the basic natural vision system, their assimilation by the pilot requires a separate cognitive process which necessarily diverts his or her attention at least momentarily from the basic image, to an assessment of the significance of the alphanumeric or graphic display.

An object of the invention is to provide a system for assisting the pilot of a low flying aircraft in the detection and recognition of obstacles, which system requires a minimal amount of computer processing, and presents information to the pilot in an ergonomically optimum manner, in that the information is easily assimilated by the pilot.

This object is achieved by the system according to the invention, in which information generated by a range imaging sensor is processed to extract therefrom a graphic display depicting the linear edge contours of detected obstacles, which display is then blended into the basic image of the natural vision system.

On the basis of the characteristics of the invention, the following advantages are achieved:

Optimal ergonomy by means of a graphic (not symbolic) display of the obstacles. A human being can make a classification much more easily on the basis of contours of an object than any algorithm. Therefore, obstacle contours are the graphically "most economical" device for displaying obstacles without any significant loss of information. This leads to low data rates at the output of the analyzing computer and to a minimal hiding of the basic image by additional obstacle information.

The method for extracting the contours utilizes the information content of the range image in an optimal manner. This results in simple algorithms which also operate robustly in the case of complex obstacle scenes and in a lower computing performance required at the analyzing computer.

For range image sensors whose imaging rate is below 25 Hz, a method for a synchronization with the basic image can be provided, which does not require navigational data.

Other objects, advantages and novel features of the present invention will become apparent from the following detailed description of the invention when considered in conjunction with the accompanying drawings.

BRIEF DESCRIPTION OF THE DRAWINGS

FIG. 3 shows a basic image acquired by a natural vision system;

FIG. 4 is a grayscale depiction of a false color coded range image;

DETAILED DESCRIPTION OF THE DRAWINGS

Figure 1:
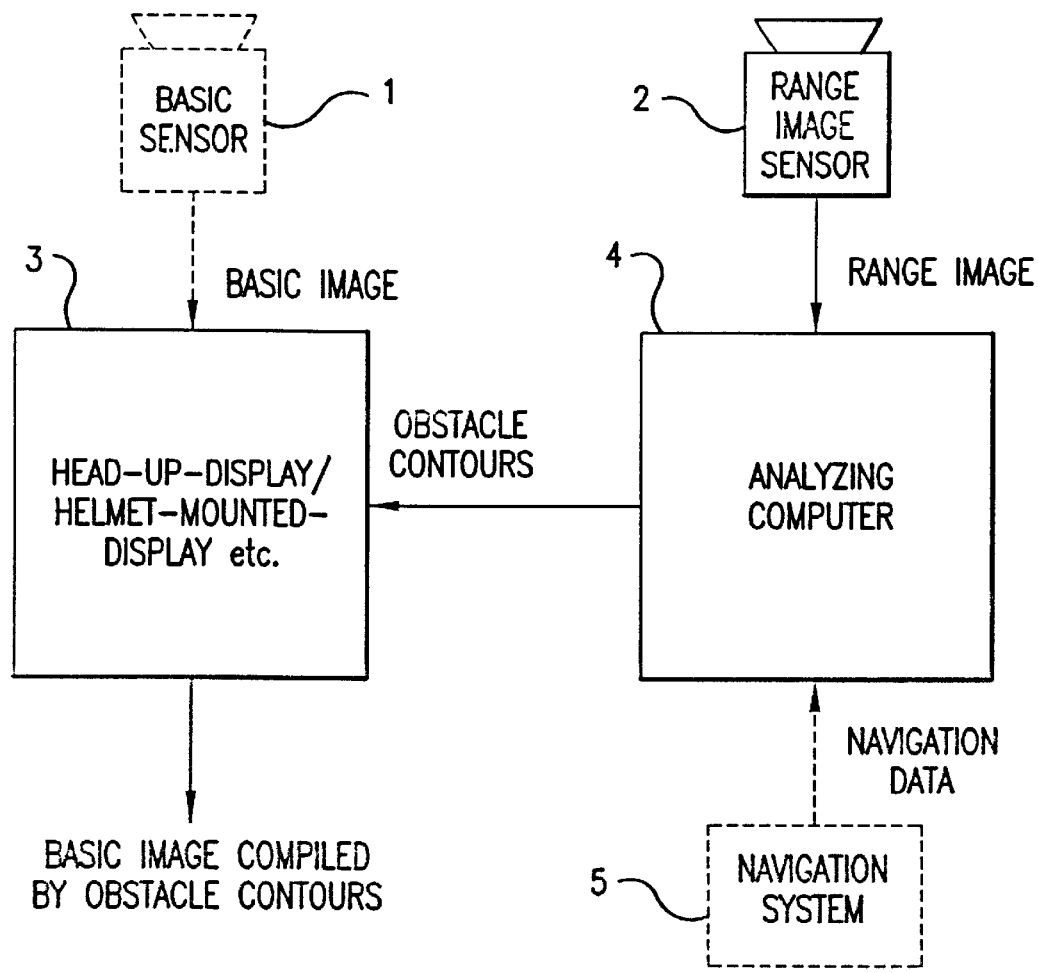
FIG. 1 is a schematic block diagram which shows the system components of the system according to the invention.

As depicted in FIG. 1, the obstacle warning system according to the invention consists of a basic sensor 1 (optionally with a low-light amplifier, such as a night viewing device), a range image sensor 2, an analyzing computer 3 for the range image processing, a display 4 with a blending-in function for a second image with respect to the basic image (such as head-up display, helmet-mounted display), and an optional navigation system 5. FIG. 1 represents these system components including their input and output.

Since the pilot flies according to the basic image, the obstacle information generated additionally by the range image sensor is blended into this basic image. For ergonomic reasons, this additional information is not abstracted alphanumerically, symbolically or in any other manner but consists of the real linear representation of the edge contours of the detected obstacles by means of which the obstacle contours, which may be less well imaged in the mere basic image, are retraced. On the whole, the obstacle warning system completes the basic image according to which the pilot flies or drives by means of the edge contours of the obstacles in the range image.

Figure 5:
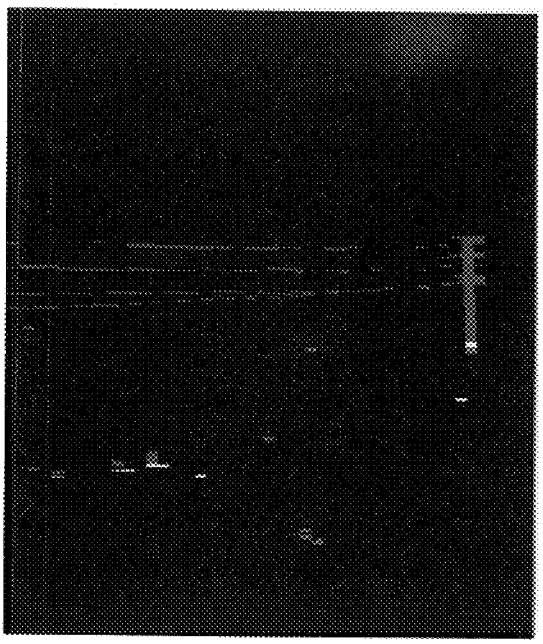
FIG. 5 shows an image processed by the application of a high-pass (contrast) filter to the range image.
Figure 6:
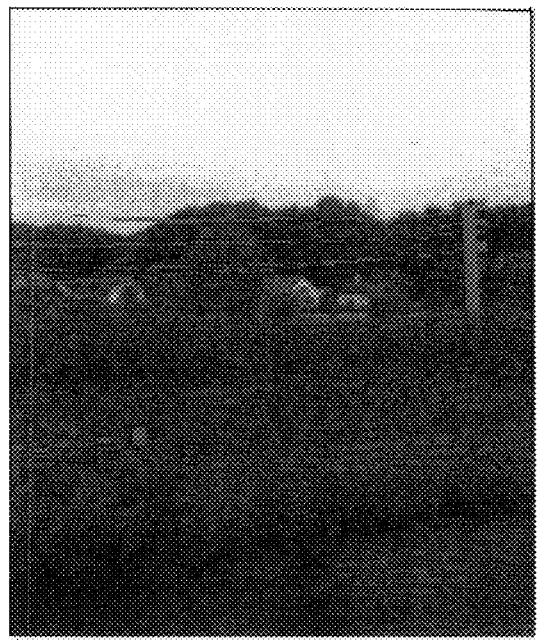
FIG. 6 shows the basic image with retraced edge contours of obstacles achieved by the invention.

According to the invention, the range image sensor 2 captures an image of the same area viewed by the basic sensor 1. The range image is processed in a conventional manner (high pass filtering) by the analyzing computer 3 to extract a linear edge contour of detected obstacles. The latter information is then provided to the display unit 4, where it is blended into the basic image (FIG. 3) to provide an enhanced image (FIG. 4) in which obstacles are displayed with sharper, more easily detectable edge contours which can be immediately recognized by the pilot. FIG. 4 shows the range image which is acquired by the range image sensor, while FIG. 5 shows the same image after it has been passed through a contrast filter.

Figure 2:
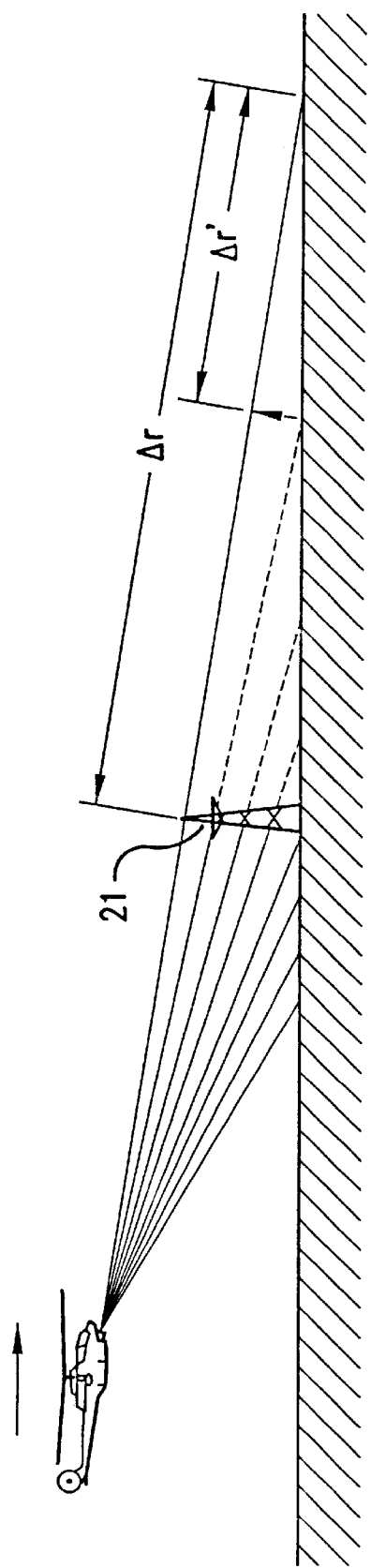
FIG. 2 is a schematic illustration of the characteristics of a range image of the contours of obstacles.

The additional range image sensor is uniquely suited for this application, because only a range image permits the robust extraction of contours of arbitrary obstacles in real time. For this purpose, it is sufficient to search for "jumps" between adjacent image pixels in the range image. That is, as depicted in FIG. 2, continuously extending terrain, has no such jumps. Note, for example, that but for the obstacle 21, the range jumps Δr between adjacent pixels are relatively small compared to the range jumps Δr' caused by the presence of the obstacle. Thus, each obstacle in the terrain results in a jump of the range measuring value at its edge. Obstacle contours can therefore be easily extracted in the range image by high-pass filtering of images.

In the case of range image sensors which have a lower imaging speed than 25–30 Hz, during the blending into the basic image, there is the problem that, because of the fast change of the basic image, the position of an object contour to be blended in cannot easily be taken over from the sensor image. This problem may be dealt with in either of two ways:

When a navigation system is present, the correct position of the obstacle contour in the basic image can be calculated at any point in time based on its position in the range image, taking into account the course of the movement of the vehicle or airborne craft in all six degrees of freedom. For this purpose, corresponding software need only be implemented in the analyzing computer.

A lower-cost solution can be achieved without a navigation system. The range image sensor generates its image as a rule by means of a vertical or horizontal scan; that is, the image is built up in lines or columns in the course of the time. Therefore, for example, in the case of the vertical scan, only those obstacle contours are blended into the basic image which occur in the currently generated range image line. Their position in the basic image is known because of the very short dead time between the detection in the range image and the blending into the basic image. During the further building-up of the range image, the faded-in object contours will not immediately disappear but become gradually weaker. The effect of this display on the whole on the pilot is that of a stripe which travels vertically through his image and which causes the contours of obstacles to be highlighted (similar to a radar screen). This stripe has the same frequency as the image buildup in the case of the sensor. The more this frequency approaches the value of 25 Hz, the better the ergonomy of the contour display.

The advantages and characteristics of the obstacle detection system according to the invention for vehicles or low-flying airborne craft are summarized as follows:

Use of suitable known software (digital high-pass filters) in conjunction with a range image camera for the data-type detection of contours of all obstacles;

ruggedness, real-time capacity and low complexity of the software because of the information content of the range image;

extraction of graphic instead of symbolic information from the range image;

high data reduction by limitation to the contours of the obstacles.

Real-time image fusion of the contour information with the basic image according to which the pilot drives/flies as a graphic person-machine interface between the pilot and the obstacle detection system;

optimal ergonomy of the obstacle warning system by blending in realistic graphic obstacle information instead of symbolic information;

minimal impairment of the basic image by blending in mere contours of obstacles rather than superimposing symbols, which can block the basic image;

scene interpretation by the person and not by the machine.

Real-time image fusion within a travelling stripe in the case of range image cameras with imaging rates of lower than 25 Hz;

a precise vehicle navigation system for a no-fault image fusion is not necessary for a lower-cost solution.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of displaying obstacle image information for use with an imaging system having a video camera, a range image sensor, a processor unit and a display for displaying image information, said method comprising the steps of:

processing a range image acquired by said range image sensor to detect discontinuities between adjacent image data in said range image, to generate one dimensional edge contour information for features present in a field of view;

displaying an image of said field of view acquired by said video camera, with said one dimensional edge contour information superimposed in spacial registration therewith; wherein said processing step comprises high pass filtering in a digital processor;

the range image sensor has an imaging speed lower than 25 to 30 Hz;

the range image sensor generates its image, scanning vertical or horizontal lines in the course of the time;

only those obstacle contours are blended into the optical image which occur in a currently generated range image line and whose position is known because of a shorter dead time between the detection in the range image and blending into the basic image; and during further building-up of the range image, previously blended in object contours become gradually weaker.

2. A method of displaying obstacle image information for use with an imaging system having a video camera, a range image sensor, a processor unit and a display for displaying image information, said method comprising the steps of:

processing a range image acquired by said range image sensor to detect discontinuities between adjacent image data in said range image, to generate one dimensional edge contour information for features present in a field of view;

displaying an image of said field of view acquired by said video camera, with said one dimensional edge contour information superimposed in spacial registration therewith; wherein said processing step comprises high pass filtering in a digital processor;

the range image sensor has an imaging speed lower than 25–30 Hz;

said imaging system includes a navigation system; and a correct position of the obstacle contour in the basic image at any point in time is calculated from its position in the range image taking into account a course of the movement of the system in all six degrees of freedom.

* * * * *